(12) United States Patent
Smith et al.

(10) Patent No.: US 7,512,207 B2
(45) Date of Patent: Mar. 31, 2009

(54) APPARATUS FOR DELIVERING A TOOL INTO A SUBMERGED BORE

(75) Inventors: Jarred Smith, Huntersville, NC (US); Jack T Matsumoto, Sunnyvale, CA (US); Christopher M Welsh, Livermore, CA (US); Trevor J Davis, Charlotte, NC (US); Jeffrey J Grinnell, West Columbia, SC (US); David P Ketcham, Charlotte, NC (US)

(73) Assignee: General Electric Company, Schenectady, NY (US)

( * ) Notice: Subject to any disclaimer, the term of this patent is extended or adjusted under 35 U.S.C. 154(b) by 187 days.

(21) Appl. No.: 11/104,583

(22) Filed: Apr. 12, 2005

(65) Prior Publication Data

US 2006/0226668 A1 Oct. 12, 2006

(51) Int. Cl.
*G21C 17/00* (2006.01)
(52) U.S. Cl. .................. 376/249; 376/245; 376/260; 73/40.5
(58) Field of Classification Search ............... 376/249, 376/245, 260; 73/40.5
See application file for complete search history.

(56) References Cited

U.S. PATENT DOCUMENTS

| | | | | |
|---|---|---|---|---|
| 2,854,758 | A | * | 10/1958 | Owen ........................ 33/544.3 |
| 3,636,778 | A | | 1/1972 | Huffstetler |
| 3,809,607 | A | * | 5/1974 | Murray et al. .............. 376/249 |
| 3,862,578 | A | | 1/1975 | Schluter |
| 4,050,384 | A | | 9/1977 | Chapman |
| 4,131,018 | A | * | 12/1978 | Muller et al. .............. 73/866.5 |
| 4,304,134 | A | | 12/1981 | Rouse et al. |
| 4,581,927 | A | | 4/1986 | Johnson |
| 4,581,938 | A | * | 4/1986 | Wentzell ..................... 73/623 |
| 4,820,982 | A | | 4/1989 | Aubert |
| 4,843,896 | A | | 7/1989 | Napeloni et al. |
| 4,876,506 | A | | 10/1989 | Brown et al. |
| 5,025,215 | A | | 6/1991 | Pirl |
| 5,028,381 | A | | 7/1991 | Dugue |
| 5,078,954 | A | * | 1/1992 | Smith et al. ................ 376/245 |
| 5,100,610 | A | * | 3/1992 | Pirl et al. ................... 376/260 |
| 5,105,881 | A | | 4/1992 | Thoms et al. |
| 5,108,693 | A | * | 4/1992 | Landry et al. .............. 376/245 |
| 5,156,803 | A | | 10/1992 | Engding et al. |
| 5,174,165 | A | | 12/1992 | Pirl |
| 5,195,392 | A | | 3/1993 | Moore et al. |
| 5,520,245 | A | | 5/1996 | Estes |

(Continued)

OTHER PUBLICATIONS

Roman, "Robots Cut Risks and Costs in Nuclear Power Plants," IEEE, Jul. 1991, pp. 11-15.*

(Continued)

*Primary Examiner*—Rick Palabrica
(74) *Attorney, Agent, or Firm*—Harness, Dickey & Pierce

(57) ABSTRACT

An apparatus for delivering a tool into a nuclear reactor jet pump submerged in a reactor pool includes a frame, and a propulsion unit for controlling the movement of the tool delivery apparatus within a pool of liquid. A guide assembly provides for delivery and insertion of the tool into an inlet of the jet pump and includes a bore insertion portion. A tool position driver provides for controlling the vertical position of the tool in relation to the guide assembly.

12 Claims, 5 Drawing Sheets

U.S. PATENT DOCUMENTS

| | | | |
|---|---|---|---|
| 5,544,205 A * | 8/1996 | Cartry | 376/245 |
| 5,544,209 A * | 8/1996 | Michaut et al. | 376/260 |
| 5,565,633 A | 10/1996 | Wernicke | |
| 5,586,155 A | 12/1996 | Erbes et al. | |
| 5,760,306 A | 6/1998 | Wyatt, III et al. | |
| 5,787,137 A | 7/1998 | Nelson, III et al. | |
| 5,878,099 A | 3/1999 | Burrows et al. | |
| 5,982,839 A | 11/1999 | Hatley | |
| 6,076,407 A * | 6/2000 | Levesque et al. | 73/623 |
| 6,169,776 B1 | 1/2001 | Collins | |
| 6,285,919 B1 * | 9/2001 | Randolph et al. | 700/245 |
| 6,526,114 B2 * | 2/2003 | Paillaman et al. | 376/249 |
| 7,092,477 B2 * | 8/2006 | Wivagg et al. | 376/249 |

OTHER PUBLICATIONS

Merriam-Webster's Collegiate Dictionary, Tenth Edition, p. 13.*
Ikegami et al., "Plant Life Management and Maintenance Technologies for Nuclear Power Plants," Hitachi Review, vol. 50 (2001), No. 3.*
Kimura et al., "Underwater Remote Handling Equipment for Reactor Internals Maintenance," ICONE 10-22188, Apr. 14-18, 2002.*

* cited by examiner

APPARATUS FOR DELIVERING A TOOL INTO A SUBMERGED BORE

CROSS-REFERENCE TO RELATED APPLICATIONS

This application is related to U.S. patent application Ser. No. 11/103,931, filed on Apr. 12, 2005, coincidental with the filing of the present application.

FIELD OF THE INVENTION

This invention relates generally to an apparatus for delivering a tool to a submerged bore, and more particularly to a assembly for delivering an inspection tool into a submerged nuclear reactor jet pump.

BACKGROUND OF THE INVENTION

Bores such as pipes or cylindrically shaped equipment are often submerged in a pool of water or other liquid. There is often a need to have a maintenance tool or inspection probe delivered into the submerged bore. For example, a reactor pressure vessel (RPV) of a boiling water reactor (BWR) typically has submerged bores that need to be inspected during maintenance routines. Hollow tubular jet pumps having internal bores are positioned within an annulus to provide the required reactor core water flow. The jet pump includes an upper portion, known as the inlet mixer, and a lower portion, known as the diffuser. The inlet mixer and the diffuser, due to their large size, are formed by welding a plurality of cylindrical and conical sections together. Specifically, respective ends of adjacent cylindrical sections are joined with a circumferential weld. During operation of the reactor, the circumferential weld joints may experience inter-granular stress corrosion cracking (IGSCC) and irradiation assisted stress corrosion cracking (IASCC) in weld heat affected zones which can diminish the structural integrity of the jet pump.

It is important to examine the welds of the jet pump inlet mixer and diffuser periodically to determine whether any cracking has occurred. While examinations in the annulus or region between a shroud and a pressure vessel wall can be performed, these examinations are likely to be only partial inspections due to access limitations in the annular region of the reactor. As such, the examination of the jet pump welds are often examined by an inspection tool positioned inside of the jet pump inlet mixer and jet pump diffuser. Such inspection tool performs ultrasonic and/or eddy current examinations of jet pump welds from inside the jet pump inlet mixer and diffuser in a nuclear reactor.

Typically, operational personnel located on a refuel bridge above the surface of the pool manipulate poles and other mechanical suspension devices to position a funnel to the inlet mixer of each jet pump to be inspected. For a single BWR, there can be up to 20 jet pumps and therefore 20 funnels must be attached and/or relocated during the operation. Once a funnel is positioned at the inlet of a jet pump inlet, the funnel is clamped to the inlet using another handling pole. As the inlet to the jet pumps are submerged, often up to 50 feet under the surface of the pool, the manual manipulation of these poles and the funnel is difficult and time consuming. After a funnel is attached to a jet pump inlet, a mechanical tool delivery assembly is placed in the pool. Typically, the tool delivery system is placed into the pool using an overhead crane and is then transferred to a monorail hoist on the refuel bridge. The tool delivery system is then lowered onto a head stud or top flange at the top of the open reactor pressure vessel RPV. The tool delivery system is placed between two adjacent jet pumps such that the position can be used to inspect both without having to move the tool delivery system. The tool delivery system is connected to the funnel with a locating cone and requires that one of the operators mate the cone, which is attached to a flexible arm on the lower portion of the tool delivery system, with the funnel. The arm must be manually manipulated by the operator from the refuel bridge using a rope to lower the tool delivery system until the cone is mated with the funnel.

After the tool delivery system is mated with the funnel, the inspection tool or probe is inserted into each of the funnel and the jet pump inlets to perform the inspection of the inside of the jet pump assembly. Once the first adjacent jet pump is inspected, the tool delivery system is disconnected from the first funnel and moved to the second funnel and the attachment, insertion, and inspection operations are repeated. The tool delivery system must be detached from the head stud or top flange for the first two jet pumps and manually moved to a position that is between two other jet pumps to be inspected. This manual process is repeated until all jet pumps have been inspected. Often the operator will utilize at least one submerged camera to aid in the movement, manipulation, attachment, and detachment of the submerged components.

In other systems and methods, a probe driver assembly can be located at the upper-most level of the probe outside of the jet pump diffuser. Such a probe driver assembly provides for axial movement of the inserted probe by using a take-up reel and a set of pinch wheels to raise and lower the probe head. However, such systems are difficult to position and require considerable operator involvement and still require manual placement on each jet pump. Additionally, as they require use of the full bridge, they require coordination with refueling operations and often result in additional reactor outage time.

As such, all of the current systems and methods require manual manipulation by poles to attach, move and operate submerged tools. These processes often require more than one operator. As such, current systems and methods for inspecting the inside of a submerged bore such as a nuclear reactor jet pump that can be submerged 50 feet below the surface of a water pool are difficult, time consuming, and costly. Often such tasks become a critical path item during a nuclear reactor reloading process. As such, any opportunity for reducing the required time can decrease the amount of off-line or down-time of the reactor and therefore provide significant cost savings to the reactor operator.

SUMMARY OF THE INVENTION

The inventors hereof have succeeded at designing an apparatus that is remotely positionable for delivering, inserting, and operating a tool within a submerged bore. This includes a system that can be placed into a reactor pool with minimal and possibly no refuel bridge support. Also, the system can provide for remotely positioning, inserting, and operating an inspection tool within a jet pump of a nuclear reactor. The various embodiments of the invention provide for a system for inspecting submerged bores such as nuclear reactor jet pumps that can provide for minimal or no use of the refuel bridge and fewer operating personnel to perform the tool delivery, and inspecting process. As such, the system can provide decreased costs associated with inspecting jet pumps or other submerged bores and reduced outage time of a nuclear reactor.

According to one aspect of the invention, an apparatus for delivering a tool into a nuclear reactor jet pump submerged in a reactor pool includes a frame, and a propulsion unit for controlling the movement of the tool delivery apparatus within a pool of liquid. A guide assembly provides for delivery and insertion of the tool into an inlet of the jet pump and includes a bore insertion portion. A tool position driver provides for controlling the vertical position of the tool in relation to the guide assembly.

According to another aspect of the invention, an apparatus for inspecting the inside of a nuclear reactor jet pump submerged in a reactor pool includes a frame and a propulsion unit for controlling the movement of the tool delivery apparatus within a pool of liquid. The propulsion unit includes a plurality of thrusters positioned about the frame for controlling the three-dimensional position and movement of the apparatus within the pool. A buoyancy chamber provides an upward lift on the apparatus within the pool. A guide assembly provides for delivery and insertion of the tool to an inlet of the jet pump and includes a bore insertion portion having a guide latch for compressively engaging a portion of an inlet. A tool position driver provides for controlling an umbilical coupled to the tool. The tool position driver and umbilical are operable to control the vertical position of the tool in relation to the guide assembly. A camera provides for generating video signal including an image of an area associated with the apparatus. A communication interface provides for transmitting the video signal to a display and receiving control signals. The propulsion unit is responsive to the received control signals.

According to yet another aspect of the invention, an apparatus for delivering a tool into a submerged bore includes a frame and a buoyancy chamber for providing an upward lift on the apparatus within the pool. A propulsion unit provides for controlling the movement of the tool delivery apparatus within a pool of liquid and includes a plurality of thrusters positioned about the frame for controlling the three-dimensional position and movement of the apparatus within the pool. A guide assembly provides for delivery and insertion of the tool to the bore and includes a bore insertion portion. A tool position driver provides for controlling the vertical position of the tool in relation to the bore insertion portion. A camera generates a video signal including an image of an area associated with the apparatus. A communication interface transmits the video signal from the apparatus to a remote receiver and receives control signals. The propulsion unit is responsive to the received control signals.

Further aspects of the present invention will be in part apparent and in part pointed out below. It should be understood that various aspects of the invention may be implemented individually or in combination with one another. It should also be understood that the detailed description and drawings, while indicating certain exemplary embodiments of the invention, are intended for purposes of illustration only and should not be construed as limiting the scope of the invention.

BRIEF DESCRIPTION OF THE DRAWINGS

Like reference symbols indicate like elements or features throughout the drawings.

DETAILED DESCRIPTION OF EXEMPLARY EMBODIMENTS

The following description is merely exemplary in nature and is in no way intended to limit the invention, its applications, or uses.

An inspection delivery assembly, according to various embodiments of the invention, includes a frame, and a propulsion unit for controlling the movement of the tool delivery apparatus within a pool of liquid. A guide assembly provides for delivery and insertion of the tool into an inlet of the jet pump and includes a bore insertion portion. A tool position driver provides for controlling the vertical position of the tool in relation to the guide assembly.

Figure 1:
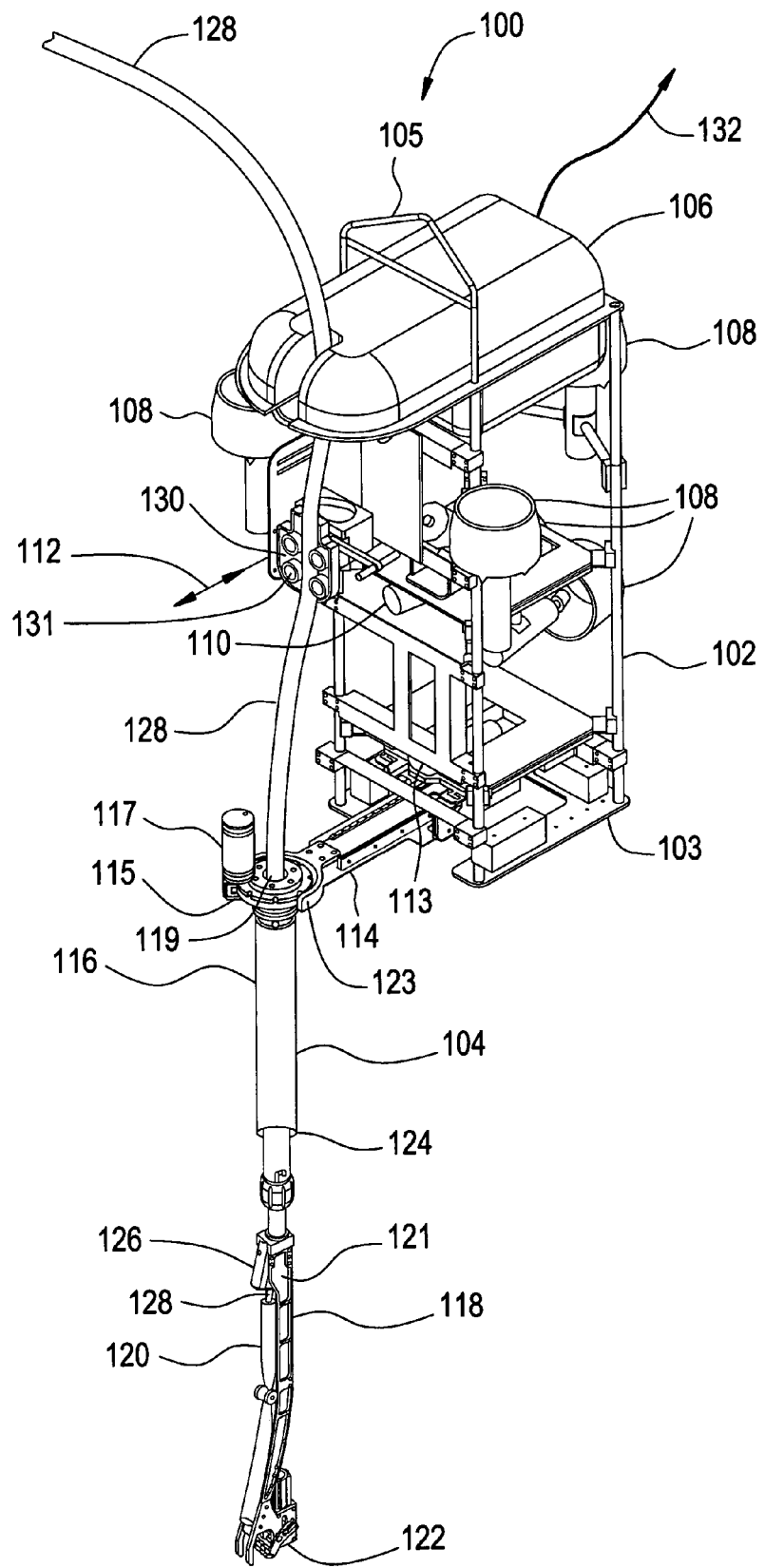
FIG. 1 is a perspective side view of a tool delivery assembly according to one exemplary embodiment of the invention.

Referring to FIG. 1, one exemplary embodiment of an inspection tool delivery assembly 100 according to the invention is illustrated. In FIG. 1, the tool delivery assembly 100 includes a submarine assembly 102 and a guide assembly 104. The submarine assembly 102 includes a structural frame 103 for supporting the various components of the submarine assembly 102 and can take any form or be composed of any suitable material. A lift or support handle 105 or support member is formed on the frame 103 or is attachable to the frame 103. The lift handle 105 is configured for supporting the tool delivery assembly 100 when not within a pool and for lowering and raising the tool delivery assembly 100 from a pool.

A floatation assembly 106 provides an upward lift to the tool delivery assembly 100 while operating in a pool. The floatation assembly 106 can include one or more ballast chambers or floatation components (not shown) such as an air tank or a floatation material as is known in the art. The floatation assembly 106 can be passive, such as with floatation material or an air tank, or can be active, and include an inflatable bladder or similar device providing a variable ballast upward lift to the tool delivery assembly 100. One or more thrusters 108 or propulsion drives can propel the tool delivery assembly 100 in three-dimensions within the pool. The thrusters 108 can be any type of propulsion drive capable of propelling the tool delivery assembly 100 in at least one direction within the liquid. By way of example, the thruster 108 can include a motor or air driven propeller device. In FIG. 1, three thrusters 108 provide for vertical movement and two thrusters 108 provide for lateral movement, the set providing for complete three dimensional movement of the tool delivery assembly 100 within the pool. More or less thrusters 108 can be provided in other embodiments and still be within the scope of the present invention. The thrusters 108 can be single speed or variable speed for moving and positioning the tool delivery assembly 100 with the pool. Such control can be from an on-board computer system or can be responsive to remote commands from a remote control or system control system (not shown).

In some embodiments, one or more video cameras 110 are positioned on the submarine assembly 102. FIG. 1 illustrates one camera 110 by way of example and is not intended to be limiting. A video signal containing an image associated with the tool delivery assembly 100 or an area about the tool delivery assembly 100 or submarine assembly 102 is transmitted from the submarine assembly 102 to a remotely located video display via a communication interface 112. The cameras 110 are positioned to provide a video image of the submarine assembly 102, the guide assembly 104, and any object or surface that is located within video imaging range of the cameras 110. The cameras 110 may be any type of video imaging device and can include one with very low lux density requirements. Also, one or more lights (not shown) can be provided on the submarine assembly 102 and positioned to illuminate objects within the view of one or more camera 110. In other embodiments, other types of sensors or cameras may similarly provide such signals. These may include ultrasonic, infrared, or radar, by way of example.

In another embodiment, a position emitter or locator (not shown) can be included on the submarine assembly 102. Where provided, the position emitter or locator can interwork with a position system for providing a position signal that indicates the position of the submarine assembly 102 within a pre-defined coordinate system. Such a coordinate system could be laid out to include the operating environment for the submarine assembly. For example, it could include the reactor pool containing submerged jetpumps or other bores. In yet other embodiments, the submarine assembly 102 can include other types of position sensors including, only by way of example, distance detectors, laser detectors, microwave detectors, sonic detectors, infrared detectors, and magnetic detectors. When provided in various embodiments, such position sensors can transmit a position signal to a remote user or remote operational system or device to aid in moving, positioning, and controlling the tool delivery assembly 100.

The guide assembly 104 is coupled to the submarine assembly 102 such that as the submarine assembly 102 moves within the pool the guide assembly 104 can be positioned for engagement or placement of one or more tools 120 within a submerged bore. In one embodiment, the submarine assembly 102 includes a linear coupling 114 to couple to the guide assembly 104. The linear coupling 114 can be adjustable or have a variable length that is controllable. The linear coupling 114 can be a slide or telescoping coupling unit with the length being adjusted by a motor 113 such that the distance between the submarine assembly 102 and the guide assembly 104 can be made to position the guide assembly 104 with a bore insertion portion 118 about a submerged bore. The motor 113 or actuator can be an electric motor, or can be an air or pneumatic actuator that provides for adjusting the coupling distance in response to received commands such as by way of a signal, energy, or actuating force. In some embodiments, the guide assembly 104 is coupled to the linear coupling 114 of the submarine assembly 102 with an adjustable rotary coupling 115, such as a slewing ring. The rotary coupling 115 portion of the linear coupling 114 can include a motor 117 or other type of actuator for rotating the guide assembly 104 about an axis. As shown, the rotary coupling 115 is about a top or upper portion of the guide assembly 104 that includes an upper cavity 119 that is configured to receive an umbilical 128 connected to one or more tools 120. The umbilical 128 can include a support or suspension cable, a sensor cable, an electrical power cable, an air cable, and/or a communication link cable. Additionally, a flexible joint or gimbal 123 can be included between the linear coupling 114 and the guide assembly 104 to provide for a flexible manipulation of the guide assembly 104 with respect to the submarine assembly 102. As shown by way of example in FIG. 1, the gimbal 123 can be positioned adjacent to or in a related manner with the top portion of the guide assembly 104 and/or the rotary coupling 115.

The guide assembly 104 includes a tool guide 116 that can be of any shape or form, but is shown in FIG. 1 as a cylinder having a first end attached to the linear coupling 114 of the submarine assembly 102 and attached at a second end at the bore insertion portion 118 of the guide assembly. The tool guide 116 can include a telescoping portion 124 that provides a variable vertical length between a proximate end near the submarine assembly 102 and a distal end of the guide assembly 104 such as the bore insertion portion 118. The bore insertion portion 118 provides for coupling to or positioning of the guide assembly 104 about a submerged bore and can also provide for holding a tool 120 in a guide channel while the tool 120 is in a non-deployed or retracted position. In such an arrangement, the umbilical 128 is positioned with the cavity 119 of the guide assembly 104 and exits at a lower cavity port 121 adjacent to or associated with the bore insertion portion 118.

As shown the bore insertion portion 118 can include a guide latch 122 configured for coupling to a bore or an inlet of a bore in which a tool 120 is to be delivered. The guide latch 122 can include a clamping or engaging mechanism as will be discussed in further detail with regard to FIG. 2. The guide assembly 104 can also include one or more cameras 126 or other sensors that provide for viewing of a portion of the guide assembly 104 and the area around the guide assembly 104 and specifically the guide latch 122. In this manner, a remotely viewed video image can aid in the positioning of the guide latch 122 to a bore or a bore inlet and aid in inserting the tool 120 within the bore. Additionally, as noted above, a light (not shown) can be provided on or associated with the bore insertion portion 118.

A tool 120 is shown positioned in the tool guide 116. The tool 120 is attached to the support umbilical 128 that provides a variety of functions and capabilities by itself or in cooperation with an operator, control system, or portions of the submarine assembly 102. For instance, the tool 120 is positioned in the guide channel and above the guide latch 122. The umbilical 128 couples to the tool 120 and is within the hollow cavity 119 of the tool guide 116 and exits at or near the rotary coupling 115.

A tool position controller 130 can engage the umbilical 128 to move the tool 120 up and down within the tool guide 116 and inserting and extracting the tool 120 from a bore. The tool position controller 130 may be of any type or arrangement, but can include, by way of example, one or more rollers, pinchers, motors, actuators, or biasing members, that engage the outer surfaces of the umbilical 128 for controlling the deployment of the umbilical 128. In one embodiment, the tool position controller 130 includes two or more pinch rollers 131, for engaging the outer portion or surface of umbilical 128. As shown in FIG. 1, by way of example, four pinch rollers 131 can be used to movably engage umbilical 128 to insert and extract tool 120 from a bore. The umbilical 128 has excess length beyond the submarine assembly 102. The tool position controller 130 operates to extend or retract the length of the umbilical 128 attached to the tool 120 and between the tool position controller 130 and the tool 120 thereby providing for the insertion and withdrawal of the tool 120 to and from a bore. The umbilical 128 can include a strength member, one or more electrical lines, communication lines, sensor lines, and/or one or more actuators lines (such as air or hydraulic pressure lines, by way of example). Further, multiple umbilicals 128 can couple to more than one tool 120 for lowering additional tools 120 into the bore. For example, a second umbilical 128 (not shown) and tool position controller 130 can separately and independently lower a second tool such as a camera into the bore.

In some embodiments, all of the umbilical 128 is routed through the tool position controller 130 as is illustrated in FIG. 1. In other embodiments, only a portion such as the strength member of the umbilical 128 is routed through the tool position controller 130 and through tool guide 116 while another portion such as the controller lines are routed separately.

The tool delivery assembly 100 can also include one or more communication link 132 to interface with a tool delivery operational system (not shown). The communication link 132 can provide for any required communication with the tool delivery assembly 100 and can include control signals. The tool delivery operational system can be one or more remote control units operated by an operator or it may be a computer system configured and operable to guide and operate one or more features or capabilities of the tool delivery assembly 100 and/or the tool 120.

In some embodiments of the invention, by way of example, a tool delivery assembly 100 for inspecting the inside of a nuclear reactor jet pump submerged in a reactor pool can include a frame and a propulsion unit for controlling the movement of the tool delivery apparatus within a pool of liquid. The propulsion unit includes a plurality of thrusters positioned about the frame for controlling the three-dimensional position and movement of the apparatus within the pool. A buoyancy chamber provides an upward lift on the apparatus within the pool. A guide assembly provides for delivery and insertion of the tool to an inlet of the jet pump and includes a bore insertion portion having a guide latch for compressively engaging a portion of an inlet. A tool position driver provides for controlling an umbilical coupled to the tool. The tool position driver and umbilical are operable to control the vertical position of the tool in relation to the guide assembly. A camera provides for generating video signal including an image of an area associated with the apparatus. A communication interface provides for transmitting the video signal to a display and receiving control signals. The propulsion unit is responsive to the received control signals.

In another exemplary embodiment, the tool delivery assembly 100 can include a frame and a buoyancy chamber for providing an upward lift on the apparatus within the pool. A propulsion unit provides for controlling the movement of the tool delivery apparatus within a pool of liquid and includes a plurality of thrusters positioned about the frame for controlling the three-dimensional position and movement of the apparatus within the pool. A guide assembly provides for delivery and insertion of the tool to the bore and includes a bore insertion portion. A tool position driver provides for controlling the vertical position of the tool in relation to the bore insertion portion. A camera generates a video signal including an image of an area associated with the apparatus. A communication interface transmits the video signal from the apparatus to a remote receiver and receives control signals. The propulsion unit is responsive to the received control signals.

Figure 2:
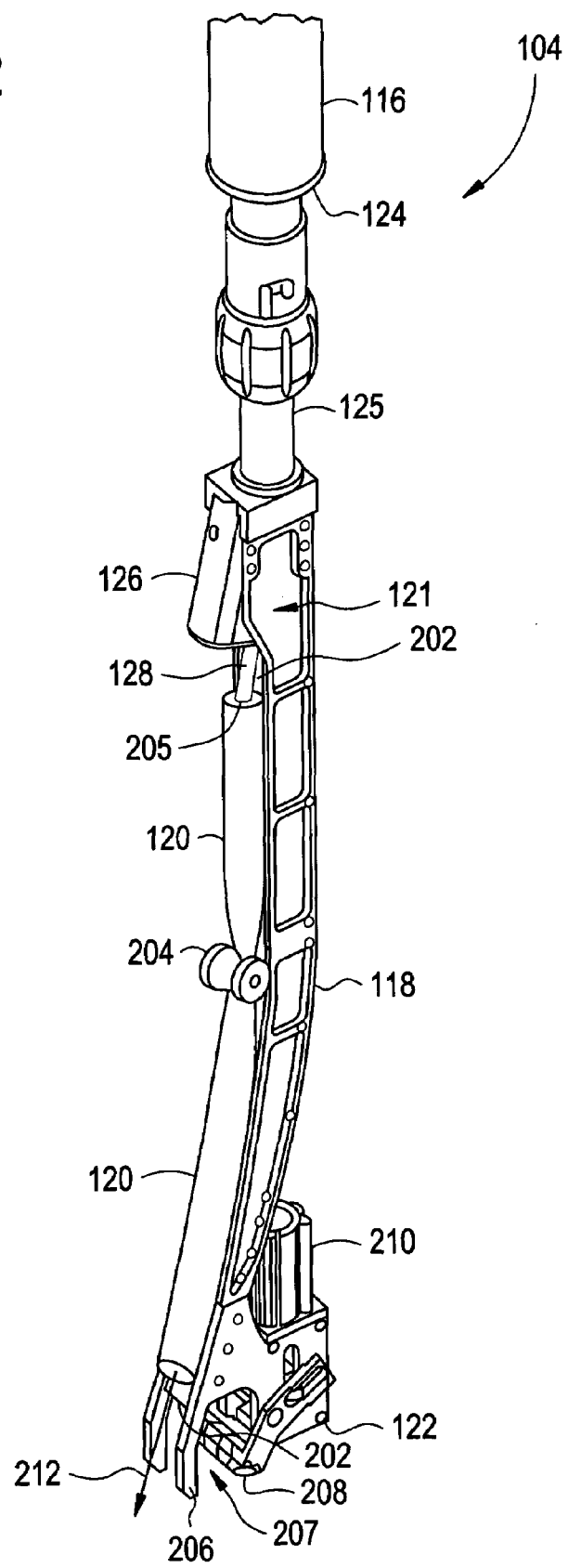
FIG. 2 is a side view of the lower portion of the tool delivery assembly configured with an exemplary inspection tool for delivery into a bore according to an exemplary embodiment of the invention.

Referring now to FIG. 2, a closer view of the guide assembly 104 illustrates the telescoping portion 124 located along the guide assembly 104, and shown, by way of example, along a portion of tool guide 116. A calibration collar 125 for a sensor located on the tool 120 can also be included for calibrating the sensor while the tool delivery assembly 100 is submerged. As shown, the tool 120 can be retracted into the bore of the guide assembly 104 through a cavity or port 121 at or near the upper portion of the guide insertion portion 118. The tool 120 is retracted until a sensor on the tool 120 is positioned within the calibration collar 125. An operator can utilize the calibration collar 125 to calibrate the tool sensors remotely. In this manner, sensors located on the tool 120 can be calibrated while the tool delivery assembly 100 is submerged within the pool rather than having to withdraw the tool delivery assembly 100 from the pool in order to calibrate the sensors.

A guide camera 126 can also be included on the guide assembly 104 and can be positioned to provide an image of the end of the bore insertion portion 118, the guide latch 122, and objects in the vicinity thereof. The tool 120 is positioned in a tool guide channel 202 and can be retained, in some embodiments, by a keeper 204, such as a roller, by way of example. Such keeper 204 can also aid in retaining the umbilical 128 when the tool 120 is inserted into a bore. The guide latch 122 is located at the end of the bore insertion portion 118 and includes one or more engagement members 206 and one or more opposing engagement members 208. A gap 207 is formed between two engagement members 206 and 208 and is configured to enclose one or more types or shapes of inlets, bores, or bore surfaces. In particular, the guide latch 122, engagement members 206 and 208, and guide channel 202 are configured to position the tool 120 for insertion into the bore as generally indicated by an arrow as path 212.

A latching actuator 210 engages one or both of the engagement members 206, 208 such that one or both move together and clamp an object or surface located in gap 207. In practice, engagement members 206, 208 and latching actuator 210 are dimensioned and arranged to couple to the bore, a lip of the bore, or an inlet to the bore, as required or desired for delivering the tool 120 into the submerged bore. For example, in one embodiment, the latching actuator 210 is an air cylinder actuator that receives air pressure from an external source. In other embodiments, the latching actuator 210 may be a motor or similar device for closing gap 207 so that engagement members 206, 208 compressively couple to a bore feature. When actuated, the latching actuator 210 compresses the opposing engagement member 208 towards engagement member 206 to clamp onto a lip or edge of a jet pump inlet positioned within gap 207. Once clamped onto the lip or edge, the bore insertion portion 118 is positioned to insert the tool 120 into the bore along path 212.

In operation of some embodiments of a tool delivery assembly 100, an operator places a portable transport and lifting device containing the tool delivery assembly 100 above a pool containing a bore. The operator lowers the tool delivery assembly 100 using lift handle 105 into the pool and activates the tool delivery assembly 100 for remote operation. The operator operates a remotely located operator or operational system that transmits control commands or similar control actions or signals to the tool delivery assembly 100. In response to the received commands, the tool delivery assembly 100 is moved within the pool by controlling the amount of thrust or force applied to the liquid by the thrusters 108 and, when available, controlling the amount of ballast provided by the floatation assembly 106. The tool delivery assembly 100 is positioned with the help of position signals and/or a video image of the tool delivery assembly 100 and objects in the vicinity thereof. The operator or operational system moves the tool delivery assembly into a position such that the guide latch 122 is positioned to couple to the edge of a bore or an inlet. The thrusters 108, the adjustable linear coupling 114, and/or the rotary coupling 115 are controlled to position the guide latch 122 into a proper latching and tool insertion position.

Once the guide latch 122 couples or clamps onto the bore or inlet, the tool delivery assembly 100 becomes partially fixed in position within the pool. In such a case, the submarine assembly 102 can be maneuvered to be adjacent to a stable or fixed object in the submerged pool if desired. The tool 120 is then inserted into the bore by deploying or retracting the umbilical 128 by controlling the tool position controller 130. Once the tool 120 has been inserted as required, the tool position controller 130 withdraws the umbilical 128 and the tool 120 from the bore in response to received commands. The guide latch 122 is thereafter released from the bore or inlet and the tool delivery assembly 100 is moved to another bore as necessary by remote control signals. Sensor on the tool 120 can be calibrated or recalibrated using the calibration collar 125 during this transfer process. When all bores within the pool have had the tool delivered, the operator positions the tool delivery assembly 100 into a position and extracts or withdraws the tool delivery assembly 100 from the pool by lifting the tool delivery assembly 100 using a portable lifting device.

Figure 3:
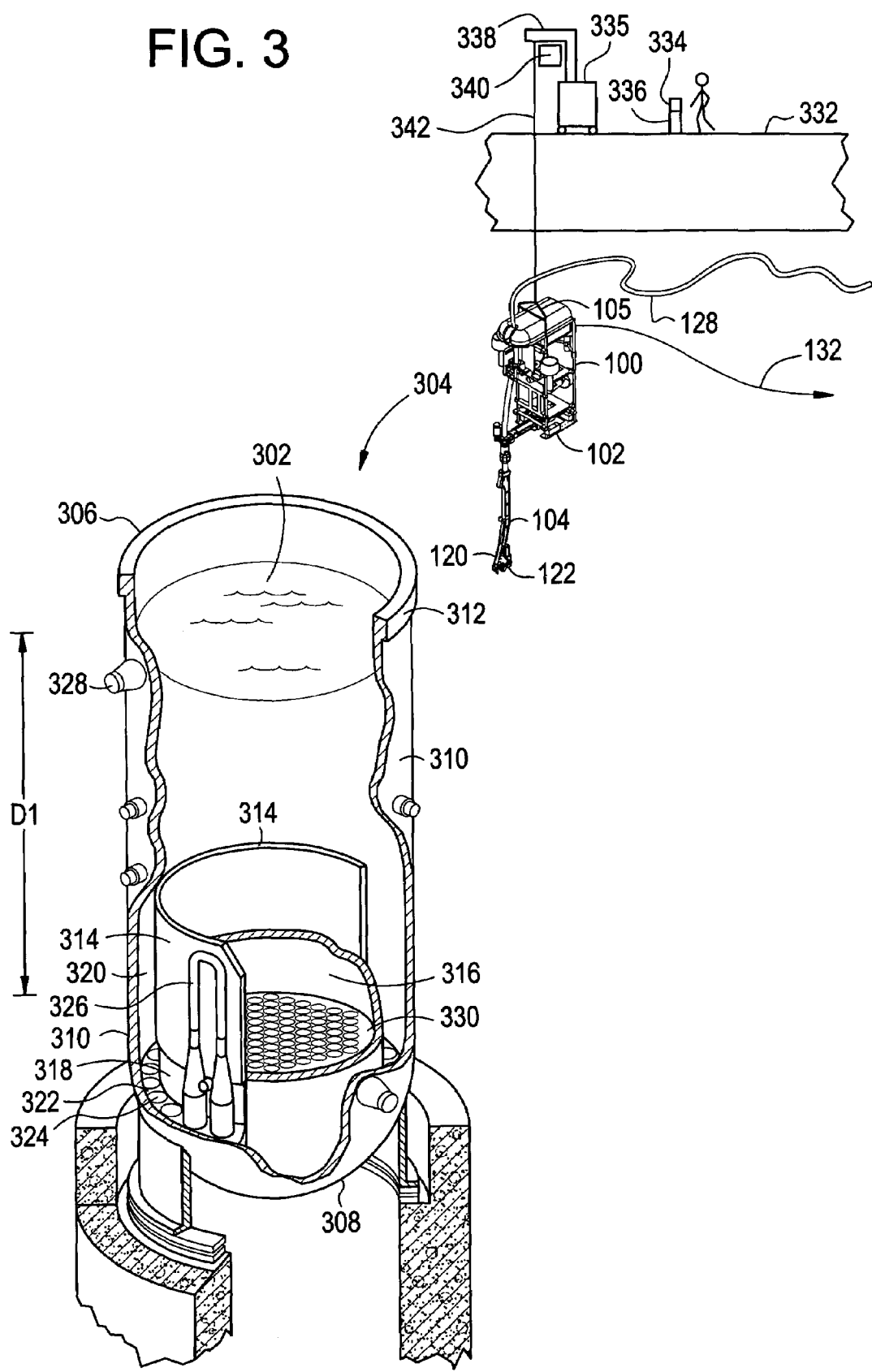
FIG. 3 is a sectional view, with parts cut away, of a partially disassembled and boiling water nuclear reactor pressure vessel containing a submerged jet pump bore according to one exemplary embodiment of the invention.

As noted, the tool delivery assembly 100 and its various features can be dimensioned and configured for delivering a variety of tools 120 to many different types of submerged bores. By way of one exemplary embodiment, referring to FIG. 3, a reactor 304 includes a reactor pressure vessel (RPV) 306 having a pool 302 of liquid, such as water, therein. The nuclear reactor 304 has one or more bores in which an inspection tool 120 is to be delivered. For clarity purposes only, FIG. 3 illustrates a sectional view, with parts cut away, of the boiling water nuclear reactor pressure vessel (RPV) 306. Typically, during operation the RPV 306 includes additional items including fuel and control rods and a cover. FIG. 3 illustrates the RPV 306 during a maintenance procedure such as a refuel procedure on the nuclear reactor 304. As such, some components have been removed and are not shown. However, this is a typical situation where an inspection tool 120 must be delivered to a submerged bore such as a jet pump for inspecting interior welds.

The RPV 306 has a generally cylindrical shape and is closed at one end by a bottom head 308 and at its other end by a removable top head (shown removed). A side wall 310 extends from the bottom head 308 to a top flange 312. A cylindrically shaped core shroud 314 surrounds a reactor core 316. The shroud 314 is supported at one end by a shroud support 318 and includes a removable shroud head (not shown) at the other end. An annulus 320 is formed between shroud 314 and side wall 310. A pump deck 322, which has a ring shape, extends between shroud support 318 and the side wall 310. The pump deck 322 includes a plurality of circular openings 324; with each opening housing a jet pump assembly 326 (only one is shown in FIG. 3 for clarity purposes). The jet pump assemblies 326 are circumferentially distributed around the core shroud 314.

During operation of the reactor 304, heat is generated within core 316 that includes fuel bundles of fissionable material (not shown). Fuel bundles are aligned by a core plate 330 located at the base of core 316. Water circulates up through core 316 and core plate 330 and is at least partially converted to steam. The steam exits RPV 306 through a steam outlet 328 near top of the RPV 306.

As FIG. 3 illustrates the RPV 306 during a maintenance procedure, an operator can be positioned along a gangway, platform, refuel bridge, or preferably the refueling floor 332 and can operator a tool delivery control system 336. The tool delivery control system 336 can include a display, a joystick, a steering wheel, a mouse, a keyboard, a voice input, or other type of operator input (not shown) for receiving an input from an operator. To aid in this process, a display 334 can provide the operator with an image generated by one or more of the cameras 110 or other sensors associated with the tool delivery assembly 100. The control system 336 generates control commands in control signals that are communicated to the tool delivery assembly 100 via communication link 132. The communication link 132 is shown as a wired link, but may be any type of communication link such as wireless, by way of example. The control system 336 can be any type of computer system or remote control device configured to receive the operator input and generate the control signals. The control system 336 can include computer executable instructions, including software, for automatically controller one or more operations of the tool delivery assembly 100, alone, or as a result of input from an operator.

In operation, during the refueling of the reactor 304 an operator positions a portable lifting and transport device 335 containing the tool delivery assembly 100 along the refueling floor 332 or other platform or structure above the pool 302 containing the bore in which the tool 120 is to be delivered. The transport device 335 can have a lifting arm assembly 338 that may include a lifting motor 340 that controls the vertical position of the tool delivery assembly 100 via an attached support cable 342. The support cable 342 is attached to the tool delivery system 100 by a permanent or detachable link (not shown) attached to the lift handle 105.

The tool delivery assembly 100 is lowered into the pool 302 that, as shown, may be within the RPV 306. The operator enters commands or inputs into the control system 336 to move the tool delivery system 100 about the pool 302. As understood to those skilled in the art, FIG. 3 is not necessarily to scale and, as such, the size of the tool delivery assembly 100 as compared to the RPV 306 or components thereof may vary in other embodiments or implementations.

In operation, the tool delivery assembly 100 is propelled by thrusters 108 in conjunction with floatation assembly 106 into the RPV 306 and down to a distance of D1. Distance D1 is the vertical distance from the top of the pool 302 to the location between the side wall 310 and the shroud 314 containing the jet pump assembly 326. The tool delivery assembly 100, in response to control signals, is positioned such that the guide assembly 104 is positioned within the annulus 320 containing the jet pump assemblies 326 and the guide latch 122 is near or adjacent to the inlet 412. The guide latch 122 is attached to the jet pump inlet 412 by activation of the latching actuator 210 such that the engagement members 206, 208 compressively engage a portion of the inlet 412 positioned within gap. The tool 120, such as a probe or inspection tool 120 that is held in position with the guide channel 202 is inserted into the jet pump 406 by activation of the vertical tool position controller 130 on the tool delivery assembly 100. The vertical tool position controller 130 can include an electrical or air driver and a pinch roller 131 arrangement that controls the vertical position and movement of umbilical 128 for raising and lowering tool 120. The tool 120 is typically lowered into the bore such as the jet pump 406 and is typically lowered to the lowest position initially. The operator or control system 336 activates the tool 120 such as the inspection probe. The vertical tool position controller 130 adjusts the vertical position of the tool 120 and can vertically index the tool 120 such that the tool 120 is moved from the lowest position to the top position with jet pump 406. In this manner, the tool 120 can be positioned to survey or sense the desired portions of the bore.

After completion of the operation of the tool 120 within the bore, the tool 120 is deactivated and the vertical tool position controller 130 extracts the tool 120 from the inlet 412 by withdrawing the umbilical 128 until the tool 120 is once again positioned within the tool guide 202 of the bore insertion portion 118. At that time, the guide latch 122 is deactivated to detach from the enclosed bore surface. At this time, the tool 120 can further be withdrawn into the guide assembly 104 bore such that a tool sensor is aligned relative to the calibrating collar 125. The operator can operator the sensors on the tool to calibrate the sensor without having to remove the tool delivery assembly 100 from the pool 302. Once detached, the tool delivery assembly 100 is moved to another bore or jet pump 406 by control signals through the operational control of one or more thrusters 108. The tool delivery assembly 100 is then positioned for another bore attachment and the process is repeated until all of the bores or jet pumps 406 have been inspected or had the tool 120 delivered as required. Once the tool 120 has been delivered to all bores within pool 302, the tool delivery assembly 100 is maneuvered to the surface of the pool 302 where an operator can attach the support cable 342 to the support or lift handle 105. The operator than utilizes the portable lifting device to lift the tool delivery assembly 100 from the pool 302 for relocation to another position or pool 302.

As is apparent to those skilled in the art, the tool delivery assembly 100 can also be configured to deliver more than one tool or inspection device. For example, in additional to delivering a tool 120, a camera or other separate sensing element can also be inserted and controlled independently of the probe 120.

Figure 4:
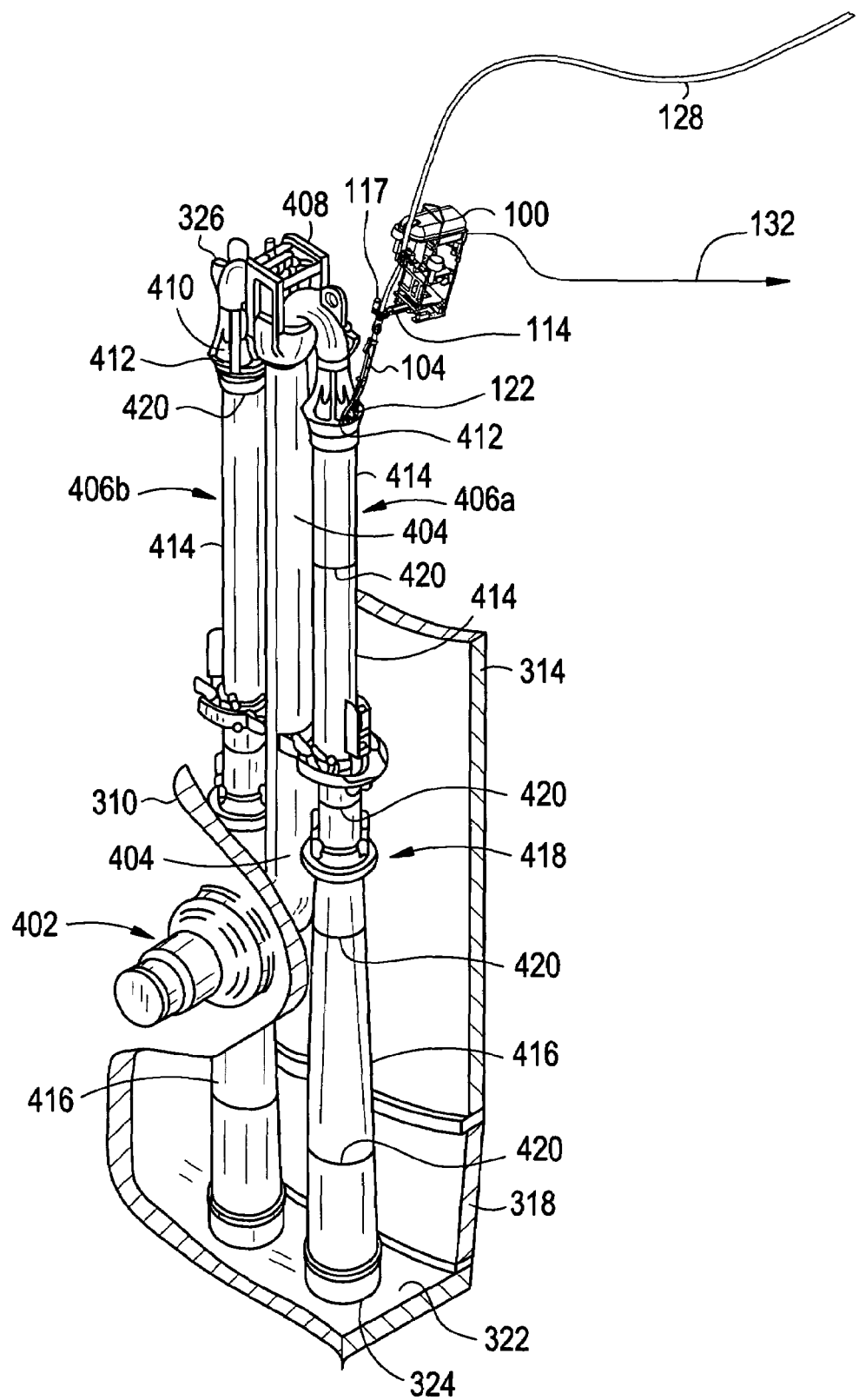
FIG. 4 is a sectional view of a tool delivery assembly coupled to an inlet of a submerged nuclear reactor jet pump according to another embodiment of the invention.

FIG. 4 is a perspective view, with parts cut away, of a jet pump assembly 326 of jet pump 406a with a coupled tool delivery assembly 100. As shown the guide latch 122 is coupled to the suction inlet 412 and the tool delivery assembly 100 is temporarily fixed, at least in part, in a position within the pool 302 relative to inlet 412.

As similar to noted above, FIG. 4 is not necessarily to scale and, as such, the size of the tool delivery assembly 100 as compared to the RPV 306, the jet pump 406, or components thereof may vary in other embodiments. For example, in one embodiment, the tool delivery assembly 100 is approximately one fourth the size of jet pump 406. An inlet nozzle 402 extends through side wall 310 of RPV 306 and is coupled to a jet pump assembly 326. The jet pump assembly 326 includes a riser pipe 404 that extends between and substantially parallel to shroud 314 and side wall 310. The riser pipe 404 is coupled to two jet pumps 406A and 406B by a transition assembly 408. Each jet pump 406 includes a jet pump nozzle 410, a suction inlet 412, an inlet mixer 414, and a diffuser 416. The jet pump nozzle 410 is positioned in suction inlet 412 that is located at a first end of inlet mixer 414. The diffuser 416 is coupled to a second end of inlet mixer 414 by a slip joint 418. Because of their large size, both inlet mixer 414 and diffuser 416 are formed from multiple cylindrical sections. Circumferential weld joints 420 join the cylindrical sections together.

As discussed above, the tool delivery assembly 100 is controlled by an operator or a control system 336 by controlling the operation of one or more of the thrusters 108 to move or maintain the position of the tool delivery assembly 100 within the pool 302. The tool delivery assembly 100 is moved and positioned about the jet pump nozzle 410 of one of the jet pumps 406 (shown as jet pump 406A) such that the guide latch 122 is positioned to engage a lip or edge of the inlet 412. Once so positioned, the guide latch 122 is activated to clamp or couple to the inlet 412 as shown. From this position, the tool 120 can be inserted into the interior of jet pump 406 as described above. Once jet pump 406A has had the tool 120 delivered as required, the tool delivery assembly 100 controls the vertical position of the tool 120 within the bore. Additionally, the tool delivery assembly 100 can also provide control signals, power, aid, etc, to the tool 120 via umbilical 128. After withdrawing the tool 120 from the inlet 412 through operation of the tool position controller 130, the guide latch 122 releases attachment from the inlet 412 and the tool delivery assembly 100 is moved to a position about another jet pump inlet 412, such as for jet pump 406b.

After attachment to inlet 412, the tool delivery assembly 100 can be moved flexibly about gimbal 123, rotary coupling 115, and linear coupling 114, to position the submarine assembly 102 at or adjacent to shroud 314. In this manner, the tool delivery assembly 100 can obtain additional stabilization during the insertion, operation, and extraction of the tool 120 from the jet pump mixer 414. In other embodiments, the submarine assembly 102 can also include one or more actuators (not shown) that can enable the submarine assembly 102 to adjust to the various distances between the shroud 314 and the side wall 310 and between the submarine assembly 102 and the inlet 412. These can be in addition to rotary coupling 115 and linear coupling 114. For example, a ball actuator (not shown) can be positioned on either side of the submarine assembly 102. Each actuator can have a plurality of ball transfers (not shown), one above and one below the center of gravity of the submarine assembly 102. The ball transfers enable the submarine assembly 102 to translate vertically and horizontally along a walled surface such as shroud 314 without affecting the distance between the guide latch 122 and the wall. These actuators can also enable the operator or control system 336 to position the guide latch 122 in a position to couple to the inlet 412.

Figure 5:
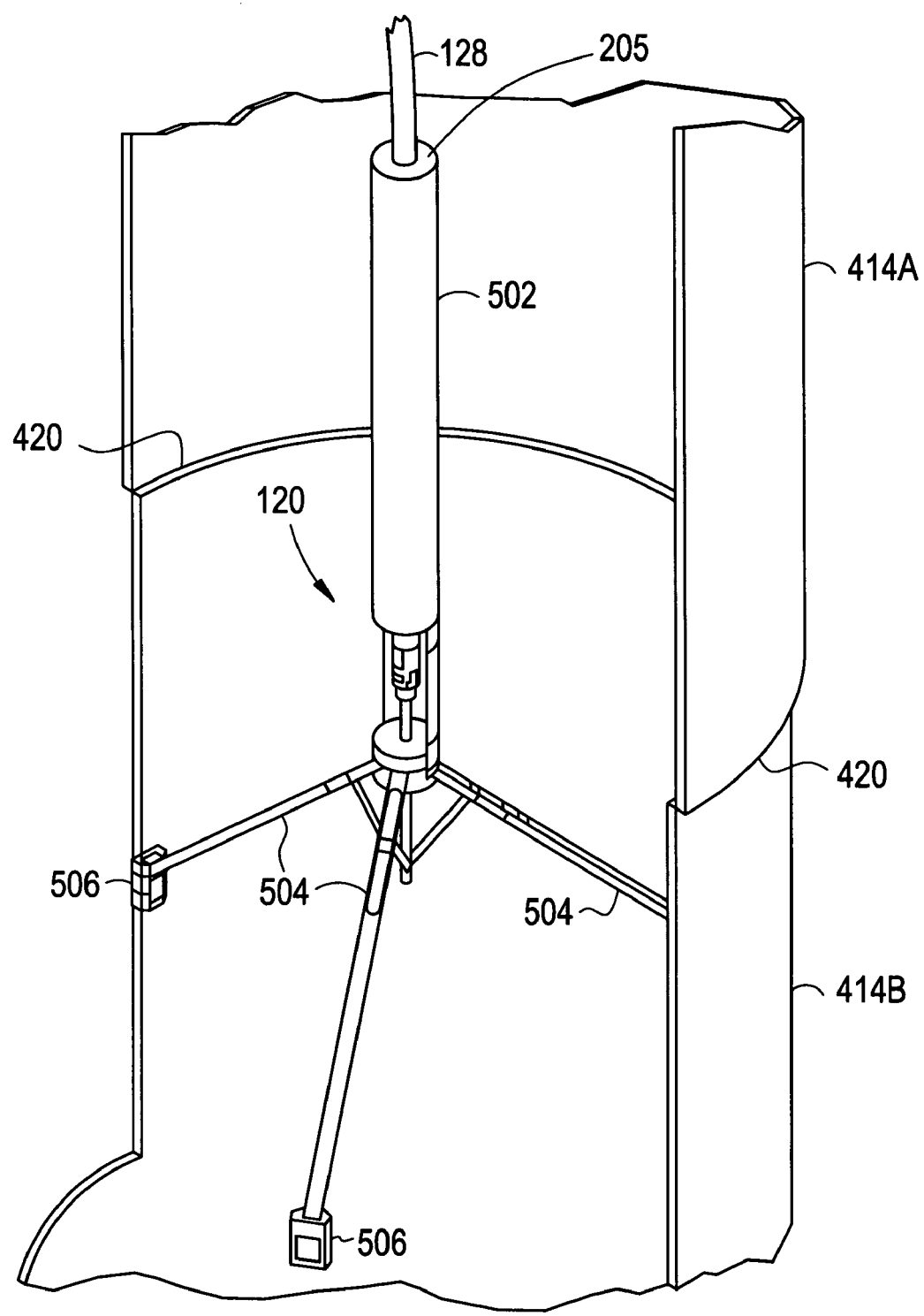
FIG. 5 is a perspective view of an inspection tool deployed within a sectional cut-away view of a submerged bore of a jet pump according to another exemplary embodiment of the invention.

Referring to FIG. 5, one embodiment of a tool 120 positioned within the jet pump inlet mixer 414. As shown, the tool 120 includes a body 502 which is suspended within a cylindrical inner portion of inlet mixer 414 via umbilical 128. As noted above, the jet pump inlet mixer 414 is composed of two coupled sections 414A and 414B. The two sections of jet pump inlet mixer 414A and 414B are coupled by a circumferential weld joint 420. The tool 120 includes, in this example, a plurality of arms 504 that extend outward from the body 502 and that have sensors 506 attached to the ends. The tool 120 moves vertically within the inlet mixer 414 to various positions to position the sensors 506 to detect one or more characteristics of the weld joints 420. Additionally, inspection tool 120 can also include a rotational capability for rotating arms 504 and sensors 506 radially within inlet mixer 414. In this manner, the full circumferential weld 420 can be sensed or inspected by sensors 506. One or more operations of the inspection tool 120 can be controlled or supported by the tool delivery assembly 100 from which the tool 120 has been inserted within the inlet mixer 414.

The above descriptions of the tool delivery assembly 100 and the reactor pressure vessel (RPV) 306 with submerged jet pumps 406 have been described. In operation, the tool delivery assembly 100 described herein can provide for significant improvements in the operational maintenance of submerged bores such as a nuclear reactor jet pump 406. The tool delivery assembly 100 can be placed into the pool 302 containing a plurality of submerged bores to be inspected. For example, a nuclear power plant can contain a plurality of reactor pressure vessels 306, each having a plurality of jet pumps 406 for which the inner welds require inspection. In such a case, once the tool delivery assembly 100 is placed within the pool 302, an operator or operational system can execute controls or commands to remotely maneuver the tool delivery assembly 100 in three dimensions with the pool 302 so as to position the guide latch 122 of the tool delivery assembly 100 about jet pump inlet 412. Once the guide latch 122 is attached to the inlet 412, the operator or operational system can operate the tool delivery assembly 100 for inserting and controlling the operation of the inspection tool 120 within the jet pump 406. After the inspection is complete, the tool 120 is withdrawn back into the tool delivery assembly 100 and the guide latch 122 is decoupled from the inlet 412. The tool delivery assembly 100 is thereafter repositioned as necessary with the pool 302. Generally, only minimal additional manual manipulations of the tool delivery assembly 100 will be required until the removal of the tool delivery assembly 100 is desired or until all submerged bores have had the tool 120 delivered therein.

When describing elements or features of the present invention or embodiments thereof, the articles "a", "an", "the", and "said" are intended to mean that there are one or more of the elements or features. The terms "comprising", "including", and "having" are intended to be inclusive and mean that there may be additional elements or features beyond those specifically described.

Those skilled in the art will recognize that various changes can be made to the exemplary embodiments and implementations described above without departing from the scope of the invention. Accordingly, all matter contained in the above description or shown in the accompanying drawings should be interpreted as illustrative and not in a limiting sense.

What is claimed is:

1. An apparatus configured to deliver a tool into a nuclear reactor jet pump submerged in a reactor pool, the apparatus comprising:
   a frame configured to be submerged in the reactor pool;
   a propulsion unit attached to the frame to control a three-dimensional movement of the apparatus in the pool;
   a guide assembly configured to deliver and insert the tool into an inlet of the jet pump;
   a linear guide arm coupling the guide assembly to the frame, the linear guide arm configured to adjust a radial position of the guide assembly with respect to the frame;
   a rotary coupler coupling the guide assembly to the linear guide arm;
   a gimbal providing a flexible link between the linear guide arm and the guide assembly; and
   a tool position driver configured to control vertical position of the tool in relation to the guide assembly;
   wherein the guide assembly comprises a bore insertion portion.

2. The apparatus of claim 1, further comprising:
   a camera configured to generate a video signal that includes an image of an area associated with the apparatus; and
   a communication interface configured to transmit the video signal to a remote receiver.

3. The apparatus of claim 2, further comprising:
   a tool delivery control system configured to control operation of the apparatus;
   an operator interface configured to receive inputs from an operator and configured to generate control signals for controlling the operation of the apparatus; and
   a communication interface configured to communicate with the apparatus over a communication link;
   wherein the tool delivery control system comprises a display configured to display to the operator an image generated by a camera disposed on the apparatus,
   wherein the communication interface is configured to receive the control signals, and
   wherein the apparatus is responsive to the received control signals.

4. The apparatus of claim 3, wherein the tool delivery control system comprises computer executable instructions configured to automatically generate control signals for controlling operation of the apparatus.

5. The apparatus of claim 1, wherein the propulsion unit comprises a plurality of thrusters positioned about the frame.

6. The apparatus of claim 1, further comprising:
   an umbilical attachable to the tool;
   wherein the tool position driver comprises a cable driver configured to control linear movement of the umbilical.

7. The apparatus of claim 1, wherein the bore insertion portion comprises:
   a guide latch; and
   a latching actuator;
   wherein the guide latch comprises two opposing engagement members positioned and movable configured to receive a portion of the inlet between the opposing engagement members, and
   wherein the latching actuator allows at least one of the opposing engagement members to move relative to an opposite opposing engagement member in order to compressively engage the inlet portion between the at least one of the opposing engagement members and the opposite opposing engagement member.

8. The apparatus of claim 7, wherein the guide assembly comprises a camera configured to generate a video signal associated with an area that includes the guide latch.

9. The apparatus of claim 1, further comprising:
   a motor configured to control the linear guide arm by adjusting the radial position of the guide assembly with respect to the frame;
   wherein the linear guide arm comprises a linear adjustable portion and a motor configured to extend and retract the linear adjustable portion, and
   wherein the guide assembly comprises a tool guide channel and a bore configured to retain the tool when in a retracted position.

10. The apparatus of claim 1, wherein the guide assembly further comprises a calibration unit configured to calibrate a sensor associated with the tool.

11. The apparatus of claim 1, further comprising:
    a portable lifting device configured to couple to the apparatus;
    wherein the lifting device is configured to control a support cable attachable to the apparatus configured to retain the apparatus when transporting the apparatus and when lowering the apparatus into the pool.

12. The apparatus of claim 1, further comprising:
    a flotation assembly configured to provide upward lift on the apparatus in the pool.

* * * * *